Sept. 14, 1965      W. E. FINKEN      3,206,637
AUTOMATIC PARKING LIGHT SYSTEM FOR MOTOR DRIVEN VEHICLE
Filed Feb. 5, 1962
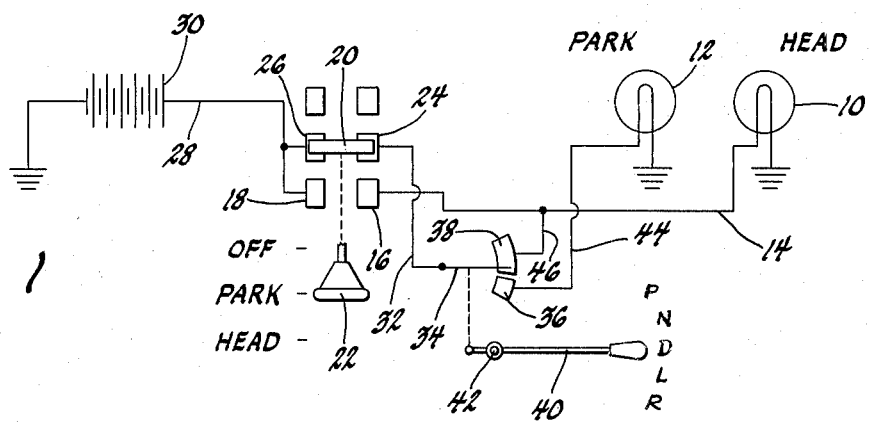
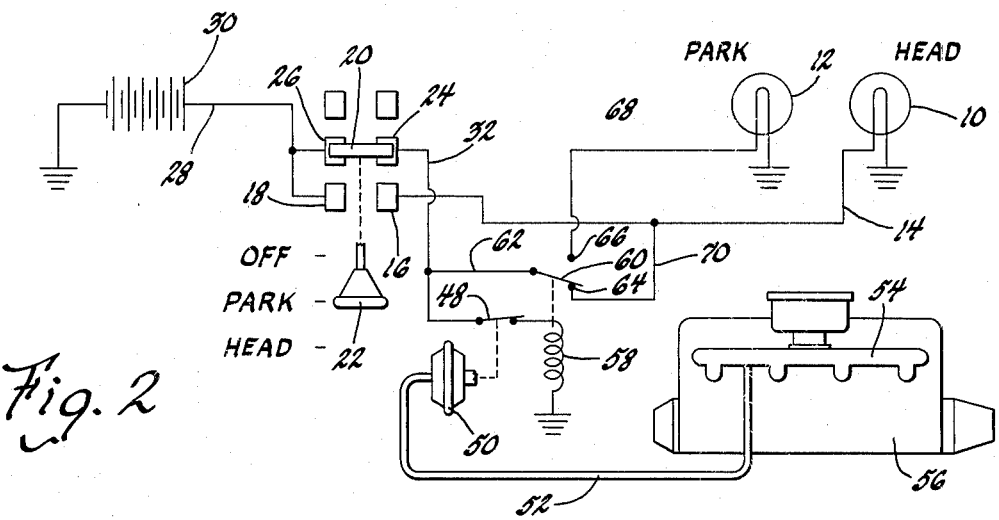
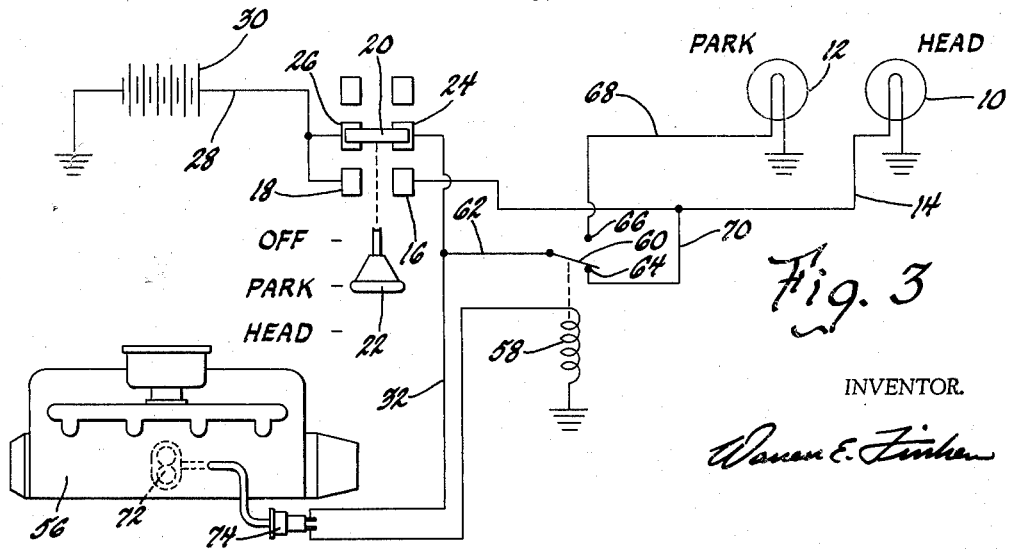
INVENTOR.
Warren E. Finken United States Patent Office 3,206,637
Patented Sept. 14, 1965

3,206,637
AUTOMATIC PARKING LIGHT SYSTEM FOR MOTOR DRIVEN VEHICLE
Warren E. Finken, Dayton, Ohio, assignor to General Motors Corporation, Detroit, Mich., a corporation of Delaware
Filed Feb. 5, 1962, Ser. No. 170,946
1 Claim. (Cl. 315—83)

This invention pertains to a vehicle lighting system, and particularly to a control system for preventing driving with parking lights.

Present day vehicles are equipped with lighting systems including headlights and parking lights. The parking lights are designed to be used as a direction indicating means and while parked at night, but are of insufficient intensity to illuminate the roadway for driving purposes. However, it has been customary for some drivers to energize the parking lights while driving during periods after dawn and before complete darkness, as well as during inclement weather conditions such as rain, snow or fog. Safety officials have recognized that this constitutes a driving hazard and have always recommended that when visibility is reduced for any reason, the headlights should be energized while driving. Recently, at least one state has enacted legislature prohibiting driving a vehicle at any time with the parking lights energized.

The present invention relates to a vehicle lighting system, and particularly to a headlight control system wherein means are provided for precluding driving with the parking lights energized. Thus, the present invention will contribute to road safety and prevent drivers from inadvertently committing a traffic violation. Accordingly, among my objects are the provision of a vehicle lighting system including means precluding energization of the parking lights while driving; the further provision of a vehicle lighting system including a neutral safety switch for automatically completing the headlight circuit when the vehicle is in gear; and the still further provision of a vehicle lighting system including means precluding energization of the parking lights when the engine is operating.

The aforementioned and other objects are accomplished in the present invention by interposing switch means in the parking light circuit of a vehicle for automatically open-circuiting the parking light system and closing the headlight circuit when the manual control switch is in the parking light position when the vehicle is being driven or when the engine is operating. Specifically, three embodiments of improved vehicle lighting control systems are disclosed herein, all of which embody a conventional manually operated headlight control switch having the usual three positions, namely off, parking lights, and headlights. In one embodiment the parking light circuit is connected through a neutral safety switch such that the parking light circuit can only be completed when the transmission selector lever is in park or neutral, while the headlight circuit will be automatically completed when the transmission selector lever is in a drive position. In a second embodiment the parking light circuit includes a vacuum operated switch which automatically prevents energization of the parking lights when the engine is operating. In a third embodiment the parking light circuit includes an oil pressure operated switch which likewise prevents energization of the parking lights when the engine is operating.

Further objects and advantages of the present invention will be apparent from the following description, reference being had to the accompanying drawing, wherein preferred embodiments of the present invention are clearly shown, and wherein similar numerals depict similar parts throughout the several views.

In the drawing:

FIGURE 1 is an electrical schematic of a first embodiment of the improved vehicle lighting system.

FIGURE 2 is an electrical schematic of a second embodiment of the improved vehicle lighting system.

FIGURE 3 is an electrical schematic of a third embodiment of the improved vehicle lighting system.

With particular reference to FIGURE 1, a vehicle lighting system is disclosed including headlights 10 and parking lights 12. The headlights 10 are connected by a wire 14 to a stationary contact 16. The contact 16 is spaced from a stationary contact 18, and the contacts 16 and 18 can be bridged by a movable contact 20 which is mechanically connected with a manually operable knob 22. In accordance with conventional practice, the knob 22 has three position, namely "off," "park" and "headlights," and is of the push-pull variety. In the "off" position the movable bridging does not complete either the headlight circuit or the parking light circuit. In the parked position, the movable contact 20 bridges stationary contacts 24 and 26. Contacts 26 and 18 are interconnected by a wire 28 with one terminal of the vehicle battery 30, the other terminal of which is grounded. Terminal 24 is connected by wire 32 to a movable switch contact 34 constituting a component of a neutral safety switch.

Safety switches have been used on some vehicles for a number of years, these switches comprising a movable contact 34 and two spaced stationary contacts 36 and 38. The movable contact is mechanically connected to a transmission selector lever 40 having an intermediate pivot 42. When the selector lever 40 is in either the "P" or "N" positions, the movable contact 34 engages the stationary contact 36 thus enabling the circuit to be completed to the starter motor of the vehicle engine. In accordance wih the present invention, the switch contact 36 is also used to complete a circuit for the parking lights 12 through wire 44. In addition, the stationary contact 38 is used to complete the circuit to the headlights 10 through wire 46 while automatically interrupting the circuit to the parking lights 12 when the selector lever 40 is in either of the drive positions "D", "L", "R". Thus, in the first embodiment of the present invention, it can be seen that no additional parts except for two wires are required to modify the lighting system of a vehicle having a neutral safety switch so as to preclude energization of the parking lights when the vehicle is being driven.

For instance, if the manual switch button 22 is moved to the parking lights position, as indicated, the parking lights 12 will be energized when the selector lever 40 is in park or neutral, since in these positions the parking light circuit will be completed through wire 44, switch contacts 36 and 34, wire 32, and contacts 24, 26 and 20. On the other hand, if the switch button 22 is left in the parking light position when the selector lever 44 is moved to either the "D," "L" or "R" position, the parking light circuit will be opened, and the headlight circuit will be automatically completed through the wire 32, switch contacts 34 and 36, wire 46 and wire 14. Thus, with the parking light switch connected through the neutral safety switch in the first embodiment, it will be impossible for the operator to drive the vehicle with the parking lights energized. Of course, the headlights 10 can always be energized while in a neutral or park position when the contact 20 bridges contacts 16 and 18.

With reference to FIGURE 2, in the second embodiment the lighting control system includes a switch 48 operated by a vacuum motor 50 connected by a conduit 52 with the intake manifold 54 of the vehicle engine 56. The switch 48 is connected to wire 32, at one end, and at the other end to a solenoid coil 58 which controls the position of a movable switch contact 60. Movable switch contact 60 is connected at one end to wire 32 by a wire 62, and is engageable with spaced contacts 64 and 66. The contact 66 is connected to wire 68 for the parking lights 12, and the contact 64 is connected to wire 70 for the headlights 10.

In the second embodiment it can be seen that whenever the engine 56 is operating, the vacuum motor 50 will close the switch 48 thereby energizing the solenoid 58 when the switch button 22 is in the parking light position. When the solenoid 58 is energized, the switch contact 60 will engage switch contact 64 thereby opening the parking light circuit and automatically closing the headlight circuit. On the other hand, when the vehicle engine 56 is not operating, the vacuum motor will open the switch 48 thereby deenergizing the solenoid 58 whereby the movable contact 60 will engage the contact 66 so as to permit energization of the parking lights 12 from the battery 30 through the wire 28, the contacts 24, 26 and 20, the wire 32, the wire 62 and the contacts 60 and 66 and the wire 68. As in the first embodiment, the headlights 10 can always be energized by movement of the contact 20 to a position whereat it bridges contacts 16 and 18.

In the third embodiment, as shown in FIGURE 3, engine operation is sensed by pressure output from the lubricating pump 72 which actuates a pressure operated switch 74 for energizing the solenoid 58. As in the second embodiment, the solenoid 58 will only be energized through the pressure operated switch 74 when the bridging contact 20 of the manual switch is in the parking light position. In operation, the parking lights 12 can only be energized when the solenoid 58 is deenergized, and thus can only be energized when the engine 56 is not operating. The headlights can always be energized by movement of the contact 20 to a position whereat it bridges contacts 16 and 18. However, with the contact 20 bridging contacts 24 and 26 the headlight circuit will automatically be completed when the engine 56 is operating through wires 32 and 62, contacts 60 and 64, and wires 70 and 14.

From the foregoing it is manifest that the present invention provides simple and economical means for automatically preventing vehicle operation with the parking lights energized since when the vehicle is being driven and the manual control switch is in either the parking light or the headlight position, the headlight circuit will automatically be closed to energize the headlights.

While the embodiments of the invention as herein described constitute preferred forms, it is to be understood that other forms might be adopted.

What is claimed is as follows:

In an automotive vehicle having a drive train, a lighting system having headlights and parking lights, an energizing circuit for said parking lights, an energizing circuit for said headlights, a manual multiple position switch movable to individually energize said parking light and said headlight circuits, a transmission selector lever connecting and disconnecting said drive train, a neutral safety multiple position switch connected in circuit with said manual switch, said neutral safety multiple position switch comprising a pair of spaced stationary electrical contacts and a movable electrical contact, a first of said stationary contacts being in the parking light energizing circuit and the second of said stationary contacts being in the headlight energizing circuit, said movable contact being actuated by said transmission selector lever to engage said second stationary contact to deenergize said parking light circuit and energize said headlight circuit when said manual switch is in the parking light circuit energizing position and the drive train is connected and to engage said first stationary contact to re-energize said parking light circuit when the drive train is disconnected.

References Cited by the Examiner
UNITED STATES PATENTS

| | | | |
|---|---|---|---|
| 1,951,495 | 3/34 | Trafton | 315—79 |
| 3,021,449 | 2/62 | Kerr | 315—79 |
| 3,068,378 | 12/62 | Bishop et al. | 315—77 |

GEORGE N. WESTBY, *Primary Examiner.*
DAVID J. GALVIN, *Examiner.*